Figure 1:
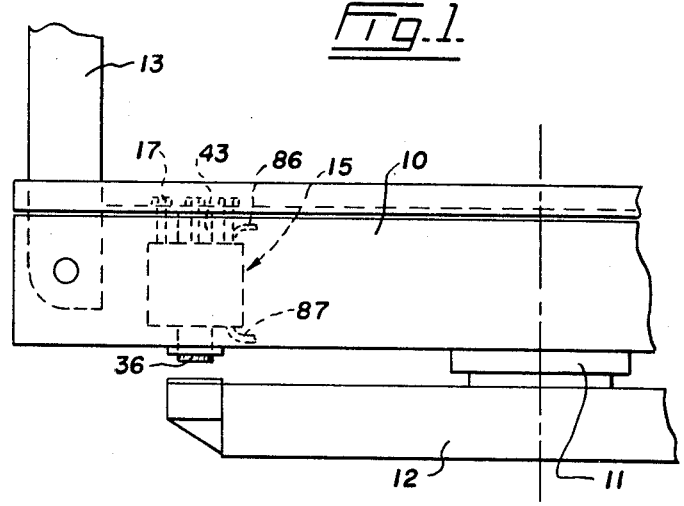

United States Patent [19]
Arden

[11] 3,710,880

[45] Jan. 16, 1973

[54] LOAD WEIGHT INDICATING APPARATUS

[76] Inventor: John Arden, 6049 Portland Street, British Columbia, Canada

[22] Filed: Oct. 22, 1971

[21] Appl. No.: 191,738

[52] U.S. Cl. ............................177/137, 177/209
[51] Int. Cl. ..........................G01g 19/08, G01g 5/04
[58] Field of Search.............177/136, 137, 209, 254

[56] References Cited

UNITED STATES PATENTS

| | | | |
|---|---|---|---|
| 1,147,128 | 7/1915 | Troll | 177/137 X |
| 2,684,594 | 7/1954 | Furcini | 177/209 X |
| 2,756,983 | 7/1956 | Furcini | 177/209 X |
| 2,867,433 | 1/1959 | Bergenheim et al. | 177/209 X |
| 2,931,638 | 4/1960 | Weber | 177/209 X |
| 3,331,458 | 7/1967 | Van Raden et al. | 177/209 X |
| 3,420,325 | 1/1969 | McAlister et al. | 177/209 X |

FOREIGN PATENTS OR APPLICATIONS 905,111   9/1952   Great Britain......................177/137

*Primary Examiner*—George H. Miller, Jr.
*Attorney*—Kellard A. Carter et al.

[57] ABSTRACT

Apparatus for indicating the weight of the load of a transport vehicle and having a plurality of units located between the load frame and support frame of the vehicle, each unit including a piston slidable in a cylinder, means for supplying pressure fluid to move the pistons to lift the load frame, means for by-passing fluid out of each cylinder when the load has been lifted, valve means for cutting off the supply means at this time, and a pressure indicator connected to the supply means between the valve and the cylinder of each unit to indicate the load when the by-pass has been cut-off.

13 Claims, 9 Drawing Figures

PATENTED JAN 16 1973 3,710,880

SHEET 1 OF 4

LOAD WEIGHT INDICATING APPARATUS

This invention relates to apparatus for indicating the weight of loads of vehicles, such as transport trucks, trailers, log trucks and the like, or loads on platform scales.

Although this load weight indicating apparatus can be used in a platform scale or with any type of vehicle, for the sake of convenience, it will be described herein in connection with a logging truck.

There has been a great deal of effort put into producing devices mounted on vehicles adjacent the load-carrying wheels thereof to measure and indicate the loads carried by the vehicles. Most of the known devices include cylinder and piston units, means for pumping fluid into the cylinders to raise the load, and weight indicators in the form of pressure meters showing the pressure in the fluid when the load is supported thereby. However, the apparatus for this purpose which is in use is not reliable. One of the reasons is that you cannot keep air out of the liquid so that the weight indications are not accurate, and the degree of inaccuracy depends upon the amount of air in the fluid at the time the load weight is being checked. Another problem with some of the known devices is that the cylinder and piston arrangement is such that it is not possible to prevent leakage of the fluid, and this can interfere with the accuracy of the indicated weight.

The present invention overcomes these problems by providing weight indicating apparatus which automatically purges the air out of the fluid and allows the scales to relax each time the apparatus is operated to obtain a load reading. In addition to this, the apparatus is so constructed that leakage of fluid is easily prevented at the cylinders.

Load weight indicating apparatus in accordance with the present invention and adapted to be mounted between the load frame and the support frame of a vehicle comprising a cylinder element, a piston element slidably mounted in the cylinder element and projecting from an end thereof towards one of said frames, means for supplying pressure fluid to the cylinder element to cause relative movement between the latter and the piston element to cause said piston element to move outwardly of the cylinder element, a rod extending between the cylinder element and the piston element connected to one element and movable relative to the other element, a return pipe, a passage in the rod having one end in communication with said return pipe and an opposite end opening out from the rod and positioned thereon where said passage communicates with the fluid supply means when the cylinder element and piston element near the end of the relative movement therebetween under action of pressure fluid, a valve in the supply means for shutting off the fluid to the cylinder element, and a pressure indicator connected to the supply means between said valve and the cylinder element.

In a logging truck having two bunks for carrying logs, there is a cylinder and piston unit at each end of each bunk extending between the bunk and the bunk support frame. When a load indication is required, fluid is pumped into each cylinder to move the pistons thereof to raise the loaded bunks. When the piston of each cylinder nears the end of its travel, a by-pass is opened so that fluid pumped into the cylinder flows back to the reservoir of the pumping system. This purges the cylinders of all air. Then valves in the fluid supply lines are closed, allowing the pistons to settle back onto the trapped fluid in the cylinders, and this action closes the by-passes. Pressure indicators or gauges, calibrated to indicate load in pounds, are connected to the fluid supply lines between these valves and the cylinders so that these gauges now give a true reading of the weight of the load supported by the bunks.

Figure 2:
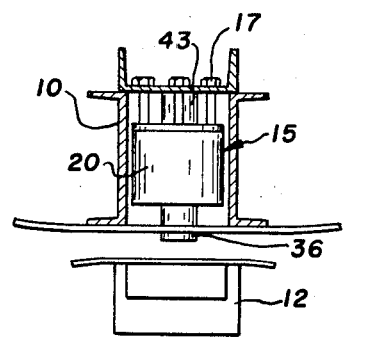
Figure 3:
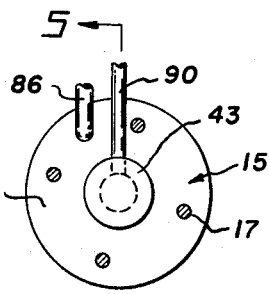
Figure 4:
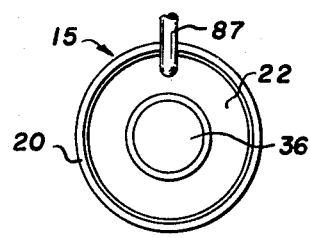
Figure 5:
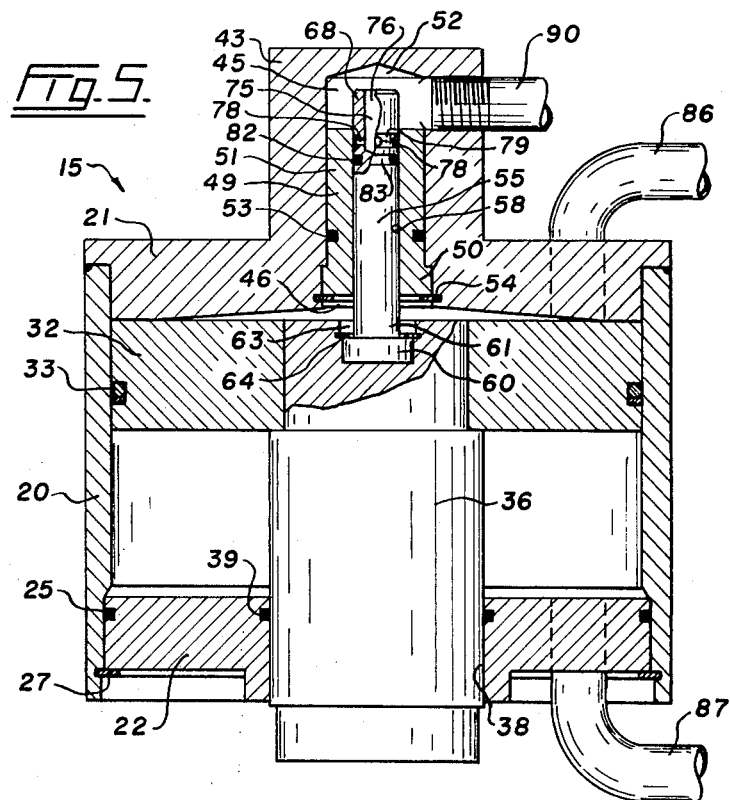
Figure 6:
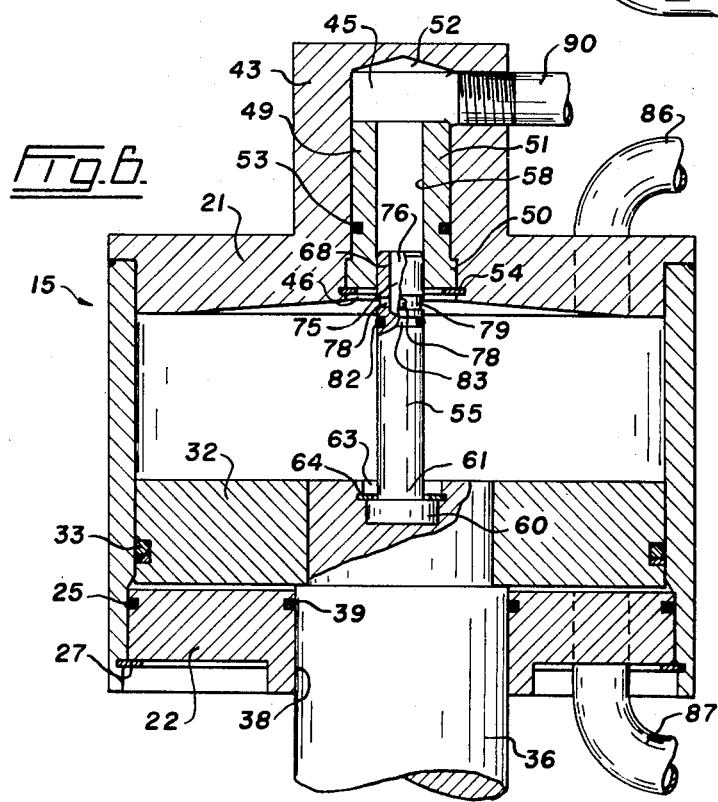
Figure 7:
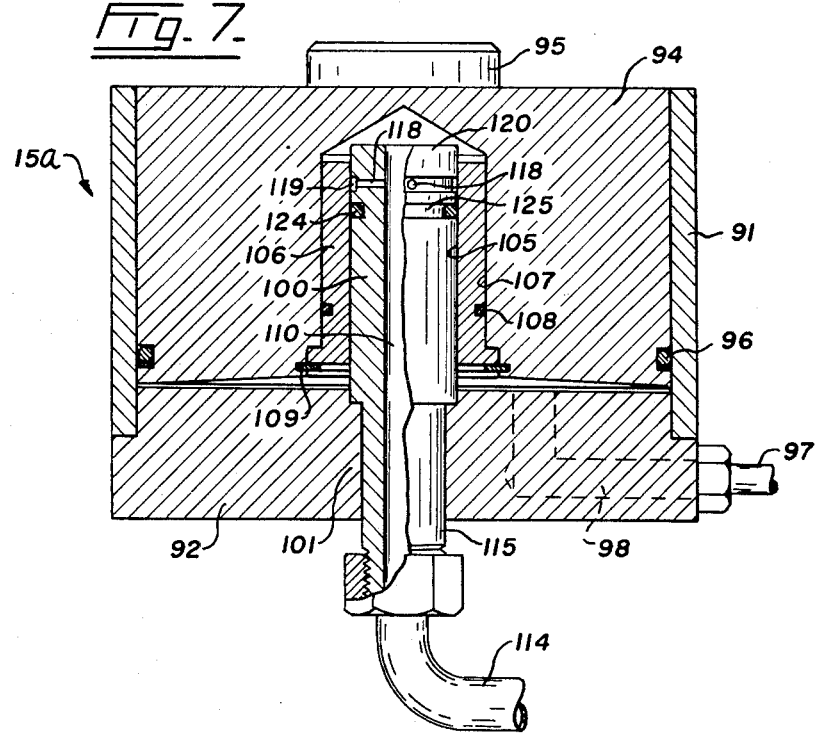
Figure 8:
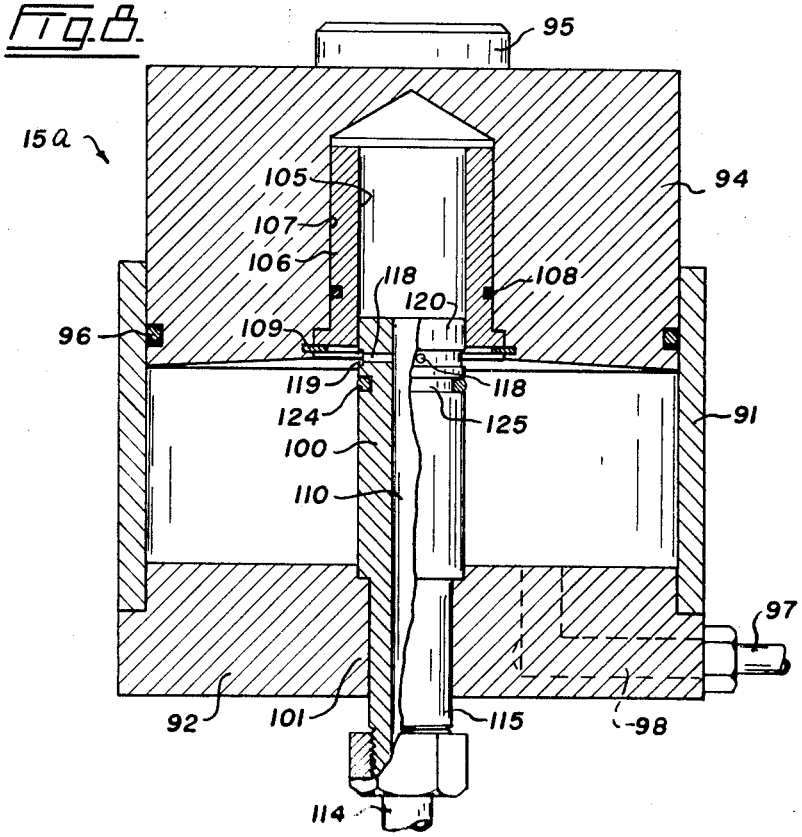
Figure 9:
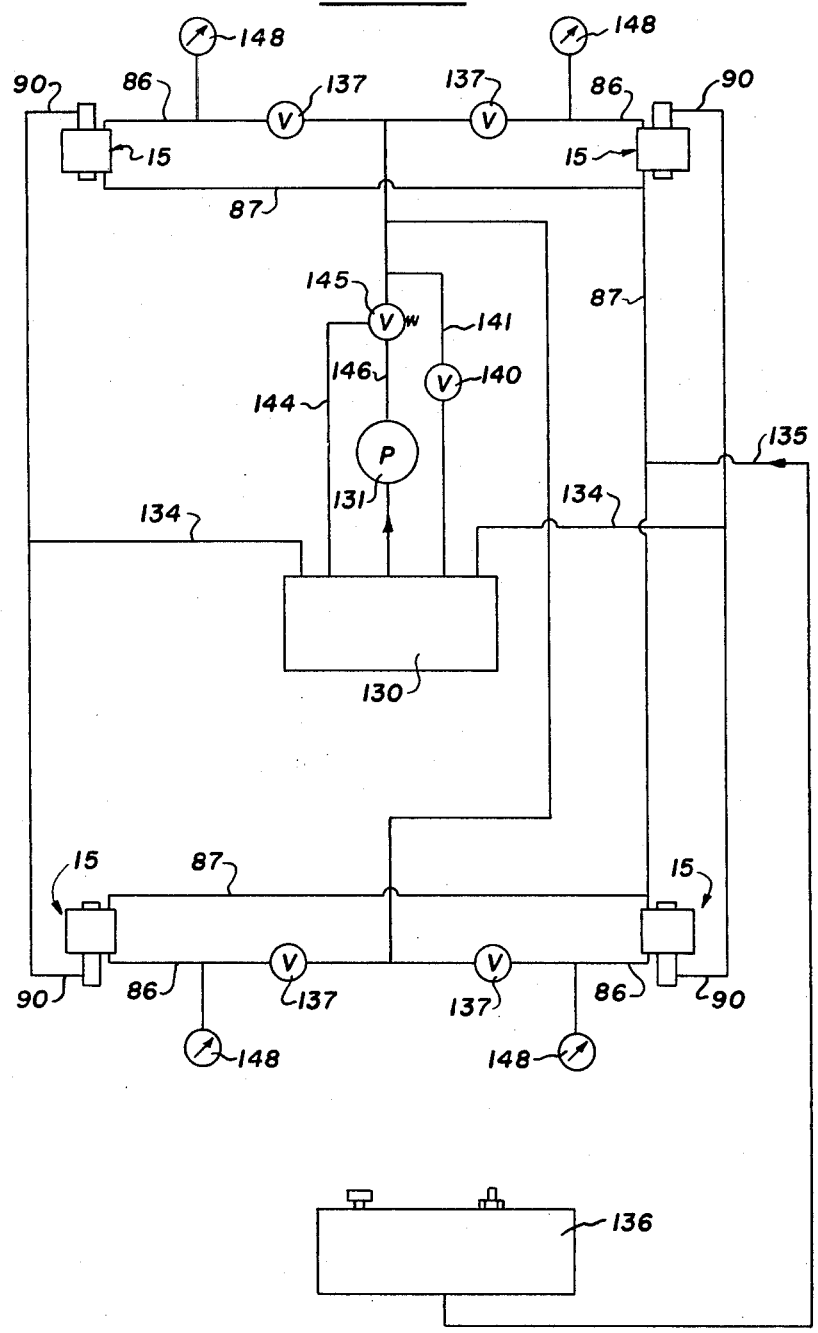

Examples of apparatus in accordance with the present invention are illustrated in the accompanying drawings, in which FIG. 1 is a side elevation of a logging bunk with the weight indicating apparatus associated therewith, FIG. 2 is an end elevation of the bunk and apparatus of FIG. 1, FIG. 3 is a plan view of one unit of the load weight indicating apparatus, FIG. 4 is a bottom view of the apparatus of FIG. 3, FIG. 5 is an enlarged vertical section through a preferred form of cylinder and piston unit for this apparatus, with the piston in the relaxed or non-load carrying position, FIG. 6 is a view similar to FIG. 5 with the piston in the load-supporting position, FIG. 7 is a vertical section similar to FIG. 5 through an alternative form of cylinder piston unit for this apparatus, with the piston in the non-load carrying position, FIG. 8 is a view similar to FIG. 7, but showing the piston in the load-supporting position, and FIG. 9 diagrammatically illustrates an example of a hydraulic system for this indicating apparatus.

Referring to FIGS. 1 to 4 of the drawings, 10 is one end of a bunk of a logging truck which is swingably mounted at 11 on a bunk support frame 12, in accordance with common practice. A stake 13 is swingably mounted on the outer end of the bunk. Load weight indicating apparatus in accordance with this invention is illustrated at 15 and is positioned between bunk 10 and support frame 12. The bunk constitutes a frame for carrying a load, in this example logs, while 12 is the support frame for the load frame. Unit 15 can be mounted on the bunk 10, as shown, and extending towards frame 12, or it can be mounted on the latter and extend towards the bunk. In this case, the unit is secured to a portion of the bunk by a plurality of bolts 17.

Unit 15 includes a cylinder 20 having an end 21 fixedly secured thereto, and an end 22 removably secured to the cylinder. A sealing ring 25 is provided between end 22 and the wall of the cylinder, and this end is removably held in place by a circlip 27.

A piston 32 is slidably mounted in cylinder 20 and preferably has a sealing ring 33 between the piston and the cylinder wall. A piston rod 36 is connected to the piston centrally thereof and slidably extends through an opening 38 in end wall 22. Between the piston rod and the surrounding portion of the cylinder end wall there is provided a sealing ring 39.

A projection is formed on and projects outwardly from end wall 21 centrally thereof, said projection having a bore 45 therein opening into the cylinder at 46. A sleeve 49, removably mounted in bore 45, has an inner end 50 at the cylinder end of bore 45 and an outer end 51 near and spaced from the outer end 52 of the bore. This sleeve fits fairly loosely in the bore, and a sealing ring 53 fits between the sleeve and bore, while clip 54 retains the sleeve in position.

A control rod 55 is secured to piston 32 and projects from the side thereof remote from piston rod 36 and slidably extends into the interior or bore 58 of sleeve 49. Rod 55 preferably has a head 60 at its inner end 61 which loosely fits into a socket 63 formed in piston 32, said rod preferably being held in place by a circlip 64. Rod 55 is long enough that its outer end 68 projects beyond sleeve 49 when piston 32 is adjacent end of wall 21 of the cylinder.

A passage 75 formed in rod 55 has one end 76 opening out from the outer end 68 of the control rod and communicating with bore 45 beyond sleeve 49. This passage has an opposite end which communicates through a plurality of orifices 78 with an annular groove 79 formed in the peripheral surface of rod 55 near but spaced inwardly from the outer end 68 of said rod. Sealing means in the form of an O-ring 82 is mounted in a groove 83 formed in the control rod near groove 79 and on the side thereof remote from the rod outer end. This sealing means or ring bears against bore 58 of sleeve 49.

A pipe 86 extending from a pump opens through cylinder end 21 into the interior of the cylinder on one side of piston 32. Another pipe 87 extending from a fluid pressure source, not shown, opens through cylinder end 22 into the cylinder on the opposite side of piston 32. A third pipe 90 opens into the end of bore 45 of projection 43 beyond the end of sleeve 49, said pipe extending to the fluid reservoir of a pumping system. The hydraulic or fluid system associated with unit 15 will be described hereinafter.

FIG. 5 shows the unit in inactive position, as it also appears in FIGS. 1 and 2. When fluid is pumped through pipe 86 into cylinder 20, piston 32 is moved downwardly to move piston rod 36 in the same direction. When this rod engages support frame 12, continued movement of the piston and piston rod raises bunk 10 a little. By this time, the piston is near end 22 of the cylinder, and control rod 55, moving with the piston, has been drawn through the bore of sleeve 49 until groove 83 and orifices 78 clear the end of the sleeve, as shown in FIG. 6. At this time, return pipe 90 is in communication with the interior of the cylinder through rod passage 75 so that the fluid being pumped into the cylinder is by-passed to the return pipe. When the supply of fluid is cut-off, as hereinafter described, the weight on bunk 10 will move cylinder 20 downwardly relative to piston 32 until groove 83 and sealing ring 82 re-enter sleeve bore 58. This closes off the by-pass so that the bunk load is now resting on the fluid trapped in the cylinder. During the by-passing of the fluid, all air is purged from the cylinder. In addition, the pressure against the seals and other elements is relaxed at this time.

Piston 32 is guided at all times by its sliding engagement with the interior wall of the cylinder and by rod 36 sliding in cylinder end 22. Sleeve 49 and control rod 55 are self-aligning because of the loose fit of the former in bore 45 and the looseness of head 60 in socket 63. The sealing ring 82 prevents leakage or by-passing of fluid from the cylinder during the operation of the unit until said ring moves out of the sleeve bore, as shown in FIG. 6. At this time the by-passing of the fluid is required. Thus, leakage of fluid into the by-pass system, when not wanted, is prevented in a very simple manner.

FIGS. 7 and 8 illustrate a weighing unit 15a which is similar to unit 15, excepting that the control rod is fixedly secured to an end of the cylinder and is slidably within the piston.

Unit 15a includes a cylinder 91 having an end 92 fixedly secured thereto. A piston 94 is slidably mounted in the cylinder and has a piston rod 95 projecting from an end thereof, said piston having a sealing ring 96 between it and the cylinder wall. Pressure fluid is supplied to the cylinder through a pipe 97 which directs the fluid into and through a passage 98 formed in the cylinder end 91 and opening into the cylinder.

A control rod 100 is secured to cylinder end 92 at 101, said rod extending into the cylinder and slidably fitting in a bore 105 formed in a sleeve 106 loosely fitting in a bore 107 formed in piston 94. A sealing ring 108 is positioned between the wall of bore 107 and sleeve 106, while a clip 108 removably retains the sleeve in position. A passage 110 is formed in and extends longitudinally of rod 100 and opens out from both ends thereof, and a return pipe 114 is connected to the outer end 115 or said rod. Passage 110 communicates through a plurality of orifices 118 with an annular groove 119 formed in the peripheral surface of rod 100 near but spaced inwardly from the outer end 120 of the rod. Sealing means in the form of an 0-ring 124 is mounted in a groove 125 in the control rod near groove 119 on the side thereof remote from the outer end of the rod. Ring 124 bears against bore 105 of sleeve 106.

When fluid is directed under pressure into cylinder 91 from pipe 97, there is relative movement between the cylinder and piston 94 to lift the log bunk 10. When groove 119 of the control rod 100 leaves bore 105 of sleeve 106, as shown in FIG. 8, the fluid flows through orifices 118 and by-passes through passage 110 and return pipe 114. The outer end 120 of rod 100 remains in the sleeve bore at this time, and when ring 124 enters this bore, it provides a seal between the by-pass and the interior of the cylinder to prevent the leakage or accidental by-passing of the fluid. The length of piston 94 keeps it stable in the cylinder, while the loose fit of sleeve 106 in piston bore 107 insures proper alignment between said sleeve and the control rod.

FIG. 9 diagrammatically illustrates a hydraulic system for the cylinder units of this apparatus, units 15 being shown in this Figure, but units 15a can be substituted therefore.

The hydraulic system includes a reservoir 130, and a pump 131 connected to the pressure pipes 86 of the units 15. The return pipes 90 of these units are connected to the reservoir by pipes 134. A control valve 137 is provided in each pipe 86 between the unit 15 thereof and the pump. The additional pressure line 87 of each unit is connected by a pipe 136 to an air-oil accumulator 137. Pipes 87 and 136 between the unit cylinders and the accumulator are kept filled with oil, and a low air pressure, for example, 10 to 15 p.s.i., is maintained in the accumulator so that piston rods 36 of the units are normally retained in their retracted positions. A manually-operable valve 140 is provided in a by-pass line 141 from the pressure side of the pump to the reservoir. When the indicating apparatus is not needed, this valve 140 is operated with valves 137 open to permit fluid to return from the unit cylinders to the reservoir under action of the accumulator pressure.

It is desirable to provide a by-pass line 144 from the pressure side of pump 131 back to the reservoir. A pressure relief valve 145 is located in pipe 146 extending from the pump and connected to pipes 86. Valve 145 is connected to line 144, and when the pressure in the fluid from the pump in pipe 146 reaches a predetermined point, valve 145 directs the fluid into line 144 and back to the reservoir.

A gauge 148 is connected to each pipe 86 between the cylinder unit 15 and the control valve 137 thereof. The gauges 148 are preferably calibrated to indicate in pounds the weight of loads put onto the cylinder unit.

When it is desired to measure a load on bunks 10 of the logging truck, valves 137 are opened, and pump 131 pumps fluid into the cylinders of units 15 against the accumulator pressure to cause the piston rods thereof to lift the ends of the bunks. When the fluid starts to by-pass through the cylinders, the pumping is continued until it is certain that all air has been purged out of the cylinders. Then valves 137 are closed. This permits the pistons to settle on the trapped fluid in the cylinders until the by-passes are closed, and then the gauges 148 indicate the pressure in the cylinders, although this is actually calibrated into pounds. Thus, gauges 148 provide an accurate reading of the load on each end of each bunk. Not only does this by-passing of the fluid purge the cylinders of air, it relaxes the pressure against the seals and other elements in the cylinders which has built up during the lifting of the load. It has been found that a given load can be lifted up numerous times by this apparatus operating in the usual manner, and the same weight reading will be given each time. However, with the same load, and stopping the pumping action before the by-passing commences, a different reading is obtained each time.

Once the readings have been noted, valves 137 are opened as well as valve 140 so that fluid flows back through pipes 86 to the reservoir under the action of the accumulator pressure. With this arrangement, the units carry loads only when it is desired to obtain an indication of the load on the vehicle.

I claim:

1. Load weight indicating apparatus for a vehicle and adapted to be mounted between a load frame and a support frame thereof, said load frame moving towards said support frame under load, comprising a cylinder element, a piston element slidably mounted in the cylinder element and projecting from an end thereof towards one of said frames, means for supplying pressure fluid to the cylinder element to cause relative movement between the latter and the piston element to cause said piston element to move outwardly of the cylinder element, a control rod extending between an end of the cylinder element and the piston element connected to one element and movable relative to the other element, a return pipe, a passage in the rod having one end in communication with said return pipe and an opposite end opening out from the rod and positioned thereon where said passage communicates with the fluid supply means when the cylinder element and piston element near the end of the relative movement therebetween under action of pressure fluid, a valve in the supply means for shutting off the fluid to the cylinder element, and a pressure indicator connected to the supply means between said valve and the cylinder element.

2. Load weight indicating apparatus as claimed in claim 1 including an air-oil accumulator system connected to the cylinder element to maintain low pressure on the piston element opposing said relative movement between the cylinder element and the piston element.

3. Load weight indicating apparatus for a vehicle and adapted to be mounted between a load frame and a support frame thereof, said load frame moving towards said support frame under load, comprising a cylinder, a piston slidably mounted in the cylinder, a piston rod connected to the piston and projecting from an end of the cylinder, means for supplying pressure fluid to the cylinder to cause relative movement between the latter and the piston to cause the piston rod to move outwardly of the cylinder, a control rod extending between an end of the cylinder and piston on the opposite side of the piston from said piston rod, a return pipe, a passage in the control rod having one end in communication with said return pipe and an opposite end opening out from the control rod and positioned thereon where said passage communicates with the fluid supply means when the cylinder and piston near the end of the relative movement therebetween under action of pressure fluid, a valve in the supply means for shutting off the fluid from the cylinder, and a pressure indicator connected to the supply means between said valve and the cylinder.

4. Load weight indicating apparatus as claimed in claim 3 in which said control rod is connected to the piston to move therewith, and including a bore in an end of the cylinder adjacent said control rod and into which the latter slidably fits, said return pipe communicating with the bore near an outer end thereof, said one end of the rod passage opening out from an outer end of the control rod into the bore, and said opposite end of the passage opening outwardly from the control rod near but spaced from the rod outer end, whereby said passage opposite end communicates with the cylinder when the cylinder and piston near the end of the relative movement therebetween while the outer end of the control rod remains in the bore.

5. Load weight indicating apparatus as claimed in claim 4 including sealing means carried by the control rod near said opposite end of the passage on the side of the latter remote from the outer end of said rod, said sealing means engaging the wall of the bore.

6. Load weight indicating apparatus as claimed in claim 3 in which said control rod is connected to and projects outwardly from the piston to move therewith, the connection of the control rod to the piston permitting a slight amount of movement therebetween, and including a bore in an end of the cylinder adjacent said control rod, a sleeve fitting in said bore and having a central bore extending therethrough, a sealing ring between the sleeve and the cylinder end bore, means retaining the sleeve in the cylinder end bore, said return pipe communicating with the cylinder end bore near an outer end thereof, said one end of the rod passage opening out from an outer end of the control rod into the cylinder end bore, and said opposite end of the passage opening outwardly from the control rod near but spaced from the rod outer end, whereby said passage opposite end communicates with the cylinder when the cylinder and piston near the end of the relative movement therebetween while the outer end of the control rod remains in the sleeve bore.

7. Load weight indicating apparatus as claimed in claim 6 including sealing means carried by the control rod near said opposite end of the passage on the side of the latter remote from the outer end of said rod, said sealing means engaging the wall of the bore.

8. Load weight indicating apparatus as claimed in claim 3 in which said control rod is connected to an end of the cylinder, and including a bore in the piston into which the control rod slidably fits, said one end of the rod passage opening out from an outer end of the rod at said end of the cylinder, said return pipe being connected to the rod outer end, and said opposite end of the passage opening out from the control rod near but spaced from an inner end of the rod whereby said passage opposite end communicates with the cylinder when the cylinder and piston near the end of the relative movement therebetween under action of the pressure fluid while the inner end of the control rod remains in the bore.

9. Load weight indicating apparatus as claimed in claim 8 including sealing means carried by the control rod near said opposite end of the passage on the side of the latter remote from the inner end of said rod, said sealing means engaging the wall of the bore.

10. Load weight indicating apparatus as claimed in claim 3 in which said control rod is connected to an end of the cylinder, and including a bore in the piston centrally thereof, a sleeve fitting in said bore and having a central bore extending therethrough, a sealing ring between the sleeve and the piston bore, means retaining the sleeve in the piston bore, said return pipe being connected to the rod outer end, and said opposite end of the passage opening out from the control rod near but spaced from an inner end of the rod whereby said passage opposite end communicates with the cylinder when the cylinder and piston near the end of the relative movement therebetween under action of the pressure fluid while the inner end of the control rod remains in the bore.

11. Load weight indicating apparatus as claimed in claim 10 including sealing means carried by the control rod near said opposite end of the passage on the side of the latter remote from the inner end of said rod, said sealing means engaging the wall of the sleeve bore.

12. Load weight indicating apparatus for a vehicle and adapted to be mounted between a load frame and a support frame thereof, said load frame moving towards said support frame under load, comprising a cylinder having a first end wall fixed thereto and a second and opposite end wall removably secured thereto, a piston slidably mounted in the cylinder, a piston rod connected to the piston and slidably extending through an opening in the second wall, sealing means between the piston rod and the second wall, a projection on and extending outwardly from the first wall and having a bore therein, a sleeve removably fitting in and secured to said bore and opening at one end into the cylinder and at an opposite end into the bore, seal means between the sleeve and the bore, a control rod connected at an end to the piston and slidably fitting in the sleeve, a passage in the control rod and having one end opening out from an outer end of the control rod and an opposite end opening out from said rod near but spaced from said rod outer end, seal means between the control rod and the sleeve and carried by the control rod, said last-mentioned seal means being positioned between said opposite end of the passage and the piston, means for supplying pressure fluid to the cylinder between the piston and the first end wall, a return pipe opening into said bore and communicating with said one end of the passage, a valve in the supply means for shutting off the fluid from the cylinder, and a pressure indicator connected to the supply means between said valve and the cylinder.

13. Load weight indicating apparatus as claimed in claim 12 including an air-oil accumulator system connected to the cylinder element to maintain low pressure on the piston element opposing said relative movement between the cylinder element and the piston element.

* * * * *